W. M. ROLPH.
SIGNALING APPARATUS FOR USE WITH MOTOR DRIVEN AND OTHER VEHICLES.
APPLICATION FILED AUG. 23, 1921.
1,406,493.
Patented Feb. 14, 1922.
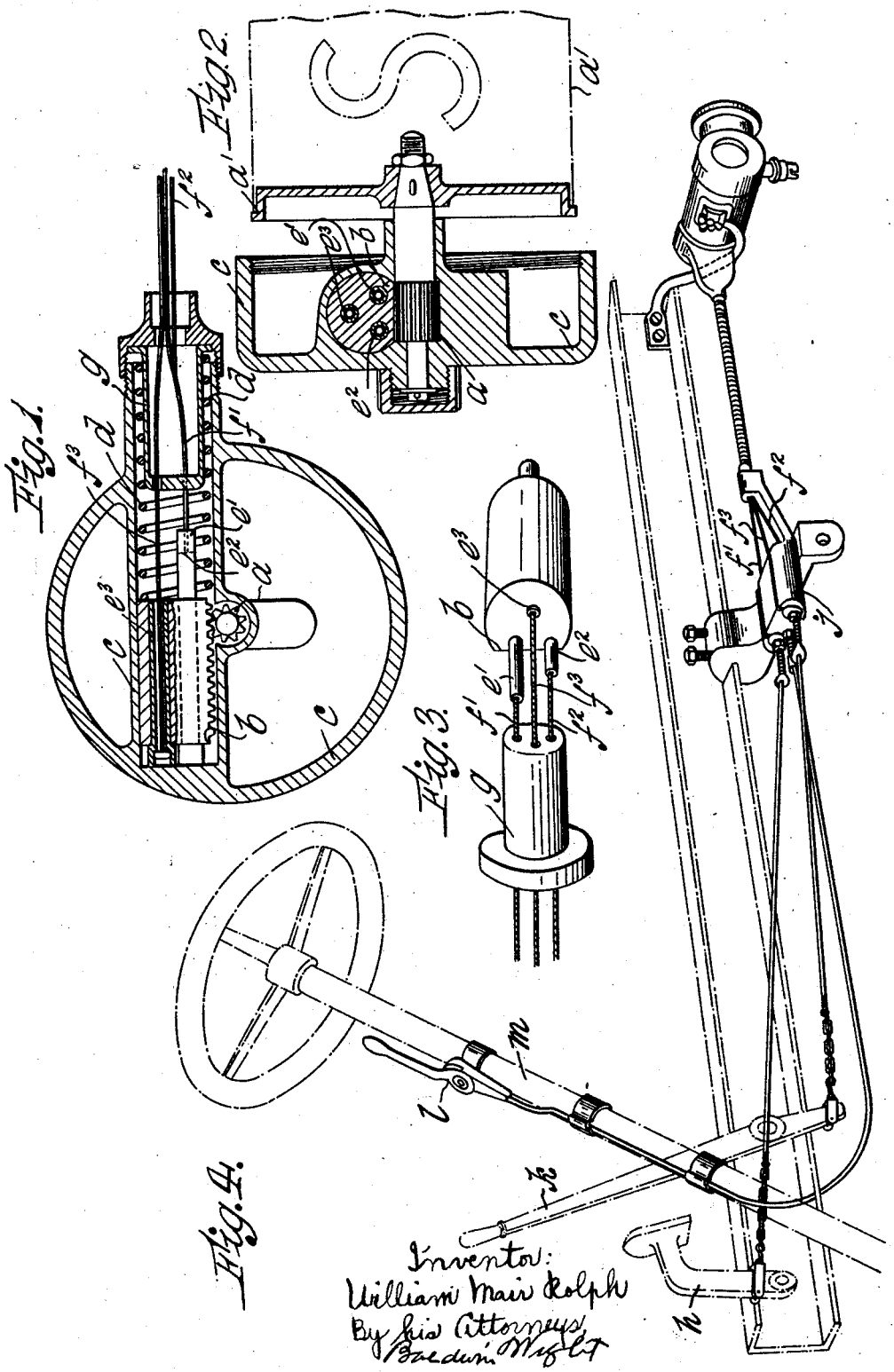

UNITED STATES PATENT OFFICE.

WILLIAM MAIR ROLPH, OF LONDON, ENGLAND.

SIGNALING APPARATUS FOR USE WITH MOTOR-DRIVEN AND OTHER VEHICLES.

1,406,493. Specification of Letters Patent. Patented Feb. 14, 1922.

Application filed August 23, 1921. Serial No. 494,720.

*To all whom it may concern:*

Be it known that I, WILLIAM MAIR ROLPH, a subject of the King of Great Britain, residing at 66 Piccadilly, London, England, have invented new and useful Improvements in and Relating to Signaling Apparatus for Use with Motor-Driven and other Vehicles, of which the following is a specification.

This invention relates to improvements in and relating to signaling apparatus for use with motor driven and other vehicles. The signaling apparatus which may be a combined signaling apparatus and tail lamp, is automatically operated by the clutch or brake pedal or side brake lever. Thus, when slowing up a vehicle either by declutching or depressing the foot brake pedal the word "slow" is automatically shown on the signaling apparatus, whilst the side brake lever causes the word "stop" to be automatically shown. On the release of the clutch, foot brake or side brake lever the signaling apparatus returns to the zero or blank position. The signaling apparatus may also display the words "left" or "right," or indicate these directions by arrows ← or →.

According to this invention the pedals and levers above mentioned are connected by means of Bowden or other wire, chain or rods to a rack sliding in a casing and actuating a pinion in such a manner that, as the respective pedal or lever is operated, a drum of the signaling apparatus carrying the signals is given the requisite amount of turning movement required to show either "slow" or "stop," "left" or "right," and on release the drum automatically returns to the zero or blank position.

The annexed drawings show apparatus made in accordance with this invention. Figures 1 and 2 are sections at right angles to each other and Figure 3 is a perspective view of the rack and stop block. Figure 4 shows the levers for operating the signaling apparatus, the signaling apparatus and levers being shown attached to one of the side beams of the vehicle.

$a$ is a pinion by which the drum $a'$ of the signaling apparatus is turned. The pinion $a$ meshes with a rack $b$ capable of sliding in a casing $c$, and $d$ is a spring in the casing which tends to force the rack $b$ towards the left hand end of the casing or zero position of the drum $a'$. In the rack $b$ are bored three holes into which tubes or nipples $e'$ $e^2$ and $e^3$ are inserted. The tube or nipple $e'$ is secured to one end of a wire $f'$ whose other end is attached to the clutch pedal or foot brake pedal $h$ or both through a compensating junction box $j$. The tube $e^2$ is connected to one end of a wire $f^2$ whose other end is connected to the side brake lever $k$ whilst the tube $e^3$ is connected to one end of a wire $f^3$ whose other end is connected to a hand or control lever $l$ on the steering column $m$ or other convenient plate, all the wires passing through holes in a stop block $g$. When either of these wires is pulled the rack $b$ moves towards the right, the distance of its travel being controlled by one or other of the tubes or nipples abutting against the stop block $g$. When the rack $b$ is released it is returned to its zero position by the spring $d$.

It will be seen that when the wire $f^2$ is pulled the rack $b$ has a longer travel than when the wire $f'$ is pulled and when the wire $f^3$ is pulled the travel is longer than when either $f'$ or $f^2$ are pulled, the rack sliding in the casing $c$ through which the tubes or nipples $e'$, $e^2$ and $e^3$ freely move or slide.

What I claim is:—

1. The combination of a signaling apparatus, a pinion actuating the signaling apparatus, a rack meshing with the pinion and means for causing the rack to travel varying distances.

2. The combination of a signaling apparatus, a pinion actuating the signaling apparatus, a rack meshing with the pinion, tubes passing through and controlling the travel of the rack and means for actuating the rack.

3. The combination of a signaling apparatus, a pinion actuating the signaling apparatus, a rack meshing with the pinion, a stop block, tubes controlling the travel of the rack, wires connected to the tubes and passing through the stop block and means for actuating the wires.

4. The combination of a signaling apparatus, a pinion actuating the signaling apparatus, a rack meshing with the pinion, tubes controlling the travel of the rack, wires connected to the tubes and means for actuating the wires.

5. The combination of a signaling apparatus, a pinion actuating the signaling apparatus, a rack meshing with the pinion, tubes of different lengths passing through and controlling the travel of the rack and means for actuating the rack.

6. The combination of a signaling apparatus, a pinion actuating the signaling apparatus, a rack meshing with the pinion, a stop block, tubes of different lengths controlling the travel of the rack, wires connected to the tubes and passing through the stop block and means for actuating the wires.

7. The combination of a signaling apparatus, a pinion actuating the signaling apparatus, a rack meshing with the pinion, tubes of different lengths controlling the travel of the rack, wires connected to the tubes and means for actuating the wires.

8. The combination of a signaling apparatus, a pinion actuating the signaling apparatus, a rack meshing with the pinion, a stop block, tubes controlling the travel of the rack, wires connected to the tubes and passing through the stop block, and one wire connected to a foot brake pedal and another to a hand brake lever.

9. The combination of a signaling apparatus, a pinion actuating the signaling apparatus, a rack meshing with the pinion, tubes controlling the travel of the rack, wires connected to the tubes, and one wire connected to a foot brake pedal and another to a hand brake lever.

10. The combination of a signaling apparatus, a pinion actuating the signaling apparatus, a rack meshing with the pinion, a stop block, tubes of different lengths controlling the travel of the rack, wires connected to the tubes and passing through the stop block, and one wire connected to a foot brake pedal and another to a hand brake lever.

11. The combination of a signaling apparatus, a pinion actuating the signaling apparatus, a rack meshing with the pinion, tubes of different lengths controlling the travel of the rack, wires connected to the tubes, and one wire connected to a foot brake pedal and another to a hand brake lever.

12. The combination of a signaling apparatus, a pinion actuating the signaling apparatus, a rack meshing with the pinion, a stop block, tubes controlling the travel of the rack, wires connected to the tubes and passing through the stop block, and one wire connected to a foot brake pedal, another to a hand brake lever and another to a hand control lever.

13. The combination of a signaling apparatus, a pinion actuating the signaling apparatus, a rack meshing with the pinion, tubes controlling the travel of the rack, wires connected to the tubes, and one wire connected to a foot brake pedal, another to a hand brake lever and another to a hand control lever.

14. The combination of a signaling apparatus, a pinion actuating the signaling apparatus, a rack meshing with the pinion, a stop block, tubes of different lengths controlling the travel of the rack, wires connected to the tubes and passing through the stop block, and one wire connected to a foot brake pedal, another to a hand brake lever and another to a hand control lever.

15. The combination of a signaling apparatus, a pinion actuating the signaling apparatus, a rack meshing with the pinion, tubes of different lengths controlling the travel of the rack, wires connected to the tubes, and one wire connected to a foot brake pedal, another to a hand brake lever and another to a hand control lever.

In testimony that I claim the foregoing as my invention I have signed my name this 28th day of July, 1921.

WILLIAM MAIR ROLPH.